April 25, 1967  R. J. CHARLSON ET AL  3,315,518
HUMIDITY SENSING DEVICES
Filed Feb. 7, 1966
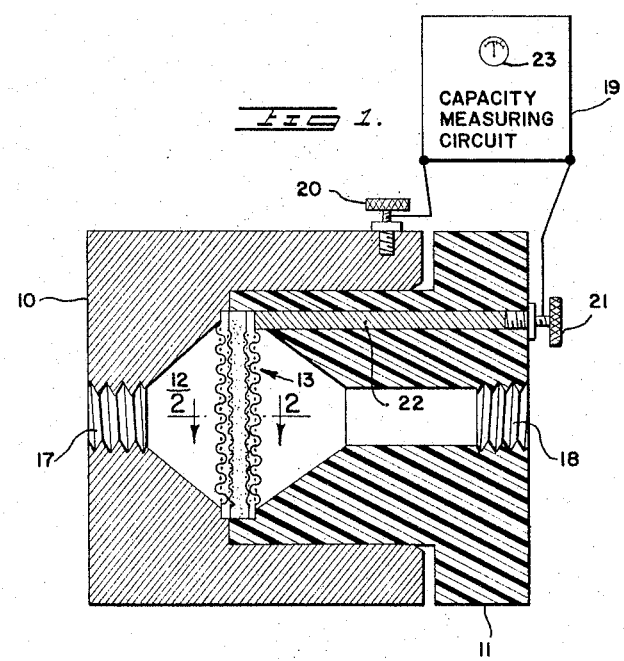
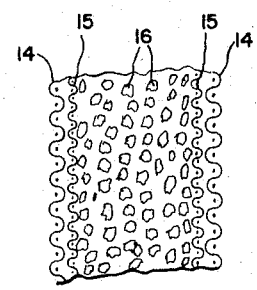
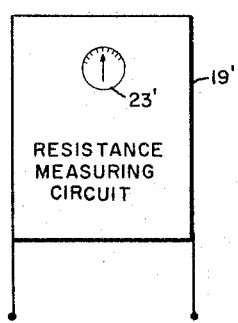
INVENTORS
Robert J. Charlson
Konrad J. K. Buettner
BY *Stowell & Stowell*
ATTORNEYS

3,315,518
HUMIDITY SENSING DEVICES
Robert J. Charlson and Konrad J. K. Buettner, both of Seattle, Wash., assignors to Research Corporation, New York, N.Y., a non-profit corporation of New York
Filed Feb. 7, 1966, Ser. No. 536,488
6 Claims. (Cl. 73—29)

This application is a continuation-in-part of our application Ser. No. 342,381, filed Feb. 4, 1964.

This invention relates to an apparatus for the measurement of the humidity content of gases.

A principal purpose of the invention is the provision of a humidity sensing device which will eliminate or alleviate the hysteresis, poor repeatability, slow response and unreliability at low humidity of hygrometric devices embodying hygroscopic solids while avoiding the disadvantages of known hygrometric devices embodying hygroscopic liquids such as the loss of liquid by bleeding or entrainment while eliminating the slow attainment of equilibrium exhibited by bulk hygroscopic liquids or by hygroscopic liquids carried by absorbtive substances.

The purposes of the invention are attained by the provision of a fluid permeable body of an inert and non-absorbing substance having a large ratio of surface area to mass, ca. 1 m.$^2$ per cm.$^3$, such as granules, fibers, or cloth, carrying a coating layer of a stable non-ionizing hygroscopic liquid of low vapor pressure at the temperature of operation and positioned between spaced conductive members whereby the variation in an electric parameter of the coated body with varying water content of the coating layer can be sensed.

More specifically, the present invention is an apparatus for the measurement of the moisture content of a gas comprising a pair of spaced electrically conductive gas permeable members, a fluid permeable body of a substrate having a large ratio of surface area to mass positioned between said conductive members and carrying a coating layer of a non-ionizing hygroscopic liquid, said substrate being fabricated of a non-hygroscopic, non-absorbent, polymeric solid having a dielectric constant below 4, gas inlet and outlet passages for passing a gas through said body and circuit elements including means responsive to changes in an electric parameter of said hygroscopic liquid layer electrically connecting said spaced conductive members.

A particularly suitable substrate material for the humidity sensitive assembly is provided by granular polytetrafluoroethylene such as the chromatographic substrates marketed by the Fluorocarbon Co., of Fullerton, Calif., under the trademark "Fluoropak." Other suitable materials include silica glasses, polymerized unsaturated hydrocarbons such as polyethylene, polypropylene and polystyrene, nylon, and other non-hygroscopic, non-absorbent synthetic polymers having a dielectric constant below 4. A low dielectric constant substrate is essential for successful operation of the humidity sensing assembly.

Typical hygroscopic liquids suitable for the coating layer include polyethylene glycols, triethylene glycol dimethyl ether, tetraethylene glycol dimethylether and, at lower temperatures, glycerol. The liquid polyethylene glycol polymer marketed by Union Carbide Chemicals Company under the trademark "Carbowax 400" is preferred. Since the substrate has a large surface area to mass ratio, up to 20% of its weight of the hygroscopic liquid phase may be used without bleeding or flowing of the liquid. The thickness of the liquid film on the substrate granules or fibers is typically of the order of 2500 A.

An illustrative embodiment of the invention will be described with reference to the accompanying drawing, in which:

FIG. 1 is transverse section of a humidity measuring apparatus embodying the principles of the invention;

FIG. 2 is an enlarged fragmentary section of the humidity sensing assembly taken on line 2—2 of FIG. 1; and FIG. 3 shows a resistance measuring circuit for use with the apparatus of FIG. 1.

In the figures, 10 is a stainless steel cylindrical cup member and 11 is a mating plastic member bored to provide a cavity 12 for seating the humidity sensing assembly 13. As is shown more clearly in FIG. 2, the sensing assembly 13 comprises a pair of circular stainless steel gauze discs 14, 14 stiffened by a pair of Chromel (nickel-chromium alloy) screen discs 15, 15 in contact therewith. The space between the discs is packed with polytetrafluoroethylene granules 16 coated with a layer about 2500 A. in thickness of liquid polyethylene glycol.

The members 10 and 11 are provided with inlet and outlet openings 17 and 18 for the passage of a gas to be tested through the humidity sensing assembly 13.

A capacity measuring circuit 19, such as a Tektronix 130LC capacitance meter, is connected across the plates 14, 14 of the humidity sensing assembly by conductors leading to binding post 20 on member 10 and to binding post 21 contacting conductive pin 22 passing through plastic member 11.

The capacity measuring circuit is shown for purposes of illustration as including an indicator 23. It may, of course, also actuate recording and/or control devices.

A resistance measuring circuit 19' may be employed in place of the capacity measuring circuit 19'. The circuit 19' is shown in FIG. 3 as including a visual indicator 23'.

Tests made with an apparatus of the type described have shown that at relative humidities up to about 70% the response time is the same for both increasing and decreasing humidity and the meter reading returns to 0 when the humidity returns to zero. When testing a gas at a relatively humidity of about 10% with a sensing assembly containing about 0.1 gram of "Carbowax 400" on the granules, the time for half response to humidity changes was about thirteen seconds at a flow rate of 15 liters per minute and a temperature of 20° C. To avoid irreversible changes at higher humidities, it is desirable to operate the apparatus at elevated temperatures.

To minimize temperature effects, it is desirable to control the temperature of the sensing assembly or to measure the temperature and correct the response for temperature effects. When the sensing assembly is maintained at a substantially constant temperature, the parameter measured is the partial pressure of water in the gas sample passing through the assembly. By providing a sensing assembly of low thermal inertia so that it remains in substantial thermal equilibrium with the gas sample passing through the assembly, the apparatus operates as a relative humidity sensor.

We claim:

1. Apparatus for the measurement of the moisture content of a gas comprising a pair of spaced electrically conductive members, a fluid permeable body of a substrate having a large ratio of surface area to mass positioned between said conductive members and carrying a coating layer of a non-ionizing hygroscopic liquid, said substrate being fabricated of a non-hygroscopic, non-absorbent, polymeric solid having a dielectric constant below 4, gas inlet and outlet passages for passing a gas through said body and circuit elements including means responsive to changes in an electric parameter of said hygroscopic liquid layer electrically connecting said spaced conductive members.

2. Apparatus as defined in claim 1 wherein the responsive means is responsive to changes in the dielectric constant of the hygroscopic liquid layer.

3. Apparatus as defined in claim 1 wherein the responsive means is responsive to changes in the electrical resistivity of the hygroscopic liquid layer.

4. Apparatus as defined in claim 1 wherein the substrate is fabricated of polyetrafluoroethylene.

5. Apparatus as defined in claim 1 wherein the electrically conductive members are gas permeable.

6. Apparatus as defined in claim 4 wherein the coating layer consists of a hygroscopic liquid polymer of ethylene glycol.

References Cited by the Examiner
UNITED STATES PATENTS

| | | | |
|---|---|---|---|
| 2,047,638 | 7/1936 | Kott | 73—336.5 |
| 2,367,561 | 1/1945 | Bouyoucos | 73—336.5 X |
| 2,377,426 | 6/1945 | Kersten | 73—336.5 X |
| 2,510,018 | 5/1950 | Gillingham | 73—336.5 |
| 2,636,962 | 4/1953 | Bouyoucos | 73—336.5 X |
| 2,701,832 | 2/1955 | Marsden et al. | 338—35 |
| 2,710,324 | 6/1955 | Harmantas | 338—35 |
| 2,714,149 | 7/1955 | Craig et al. | 73—336.5 |
| 2,728,831 | 12/1955 | Pope | 73—336.5 |
| 2,941,174 | 12/1955 | Richards | 338—35 X |
| 2,976,728 | 3/1961 | Brogan et al. | 73—336.5 |
| 3,102,051 | 8/1963 | Michaels et al. | 73—335 X |

LEONARD FORMAN, *Primary Examiner.*

W. D. MARTIN, *Assistant Examiner.*